(12) United States Patent
Hayashi

(10) Patent No.: US 10,126,765 B2
(45) Date of Patent: Nov. 13, 2018

(54) SEMICONDUCTOR DEVICE HAVING INTERNAL VOLTAGE GENERATING CIRCUIT

(71) Applicant: PS4 Luxco S.a.r.l., Luxembourg (LU)

(72) Inventor: Koichiro Hayashi, Tokyo (JP)

(73) Assignee: LONGITUDE LICENSING LIMITED, Dublin (IE)

( * ) Notice: Subject to any disclaimer, the term of this patent is extended or adjusted under 35 U.S.C. 154(b) by 152 days.

(21) Appl. No.: 15/230,902

(22) Filed: Aug. 8, 2016

(65) Prior Publication Data

US 2016/0342164 A1 Nov. 24, 2016

Related U.S. Application Data

(63) Continuation of application No. 14/664,128, filed on Mar. 20, 2015, now Pat. No. 9,411,347, which is a continuation of application No. 12/926,589, filed on Nov. 29, 2010, now Pat. No. 8,987,937.

(30) Foreign Application Priority Data

Nov. 30, 2009 (JP) ................. 2009-271853

(51) Int. Cl.
*G05F 1/46* (2006.01)
*H02M 1/00* (2006.01)
*H02M 3/07* (2006.01)

(52) U.S. Cl.
CPC ............. *G05F 1/465* (2013.01); *H02M 3/07* (2013.01); *H02M 2001/0032* (2013.01); *Y02B 70/16* (2013.01); *Y10T 307/50* (2015.04); *Y10T 307/505* (2015.04); *Y10T 307/675* (2015.04)

(58) Field of Classification Search
None
See application file for complete search history.

(56) References Cited

U.S. PATENT DOCUMENTS

| 2008/0074170 A1* | 3/2008 | Hsu ........................ G11C 5/145 327/536 |
| 2010/0321956 A1* | 12/2010 | Yeh ................... H02M 3/33507 363/16 |
| 2013/0127436 A1* | 5/2013 | Hu ............................ G05F 3/02 323/304 |

* cited by examiner

*Primary Examiner* — Jared Fureman
*Assistant Examiner* — Aqeel Bukhari
(74) *Attorney, Agent, or Firm* — Kunzler, PC

(57) ABSTRACT

A semiconductor device including a first internal voltage generating circuit that includes a capacitor including a first electrode and a second electrode, and the first internal voltage generating circuit to generate an internal voltage by charging the capacitor to a first voltage and applying a second voltage to the first electrode of the capacitor to generate a third voltage that is greater than the first and the second voltages on the second electrode in absolute value, and a control circuit to perform a control by applying a fourth voltage that is less than the first voltage to the capacitor when the first internal voltage generating circuit is in a standby state.

14 Claims, 10 Drawing Sheets

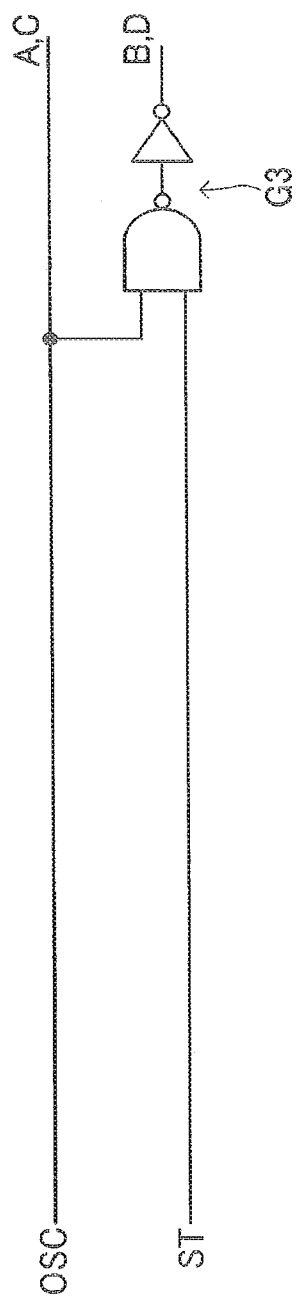

SEMICONDUCTOR DEVICE HAVING INTERNAL VOLTAGE GENERATING CIRCUIT

CROSS-REFERENCE TO RELATED APPLICATIONS

The present application is a Continuation application of U.S. patent application Ser. No. 14/664,128, filed on Mar. 20, 2015, which is a Continuation application of U.S. patent application Ser. No. 12/926,589, filed on Nov. 29, 2010, now U.S. Pat. No. 8,987,937 which issued on Mar. 24, 2015, which is based on Japanese Patent Application No. 2009-271853 filed on Nov. 30, 2009, all of which are hereby incorporated in their entirety.

BACKGROUND OF THE INVENTION

Field of the Invention

The present invention relates to a semiconductor device, and more particularly relates to a semiconductor device including an internal voltage generating circuit that generates an internal voltage by a charge pump operation.

Description of Related Art

Some semiconductor devices require a boost potential that is higher than a power source potential supplied from outside and a negative potential that is lower than a ground potential. Such semiconductor devices include therein an internal voltage generating circuit that generates a boost potential and a negative potential (see Japanese Patent Application Laid-open Nos. 2003-298957, 2007-325430, 2009-17717, and 2009-116684). A representative example of the internal voltage generating circuit is a charge pump circuit that performs step up or step down of a voltage by pumping using a capacitor. The charge pump circuit performs a boost operation by repeating a charge operation for charging the capacitor and a discharge operation for pumping the charged capacitor.

An internal voltage, which is an output of an internal voltage generating circuit, is used in various circuit blocks included in a semiconductor device. When these circuit blocks are in a standby state, the internal voltage generating circuit is also in a standby state, to save the power consumption. At this time, it is desirable to set the internal voltage generating circuit to a standby state while it is in a state of a charge operation.

However, when the internal voltage generating circuit is maintained in a state of the charge operation, a predetermined voltage is kept being applied to both ends of the capacitor, and this causes a problem of generating a certain degree of power consumption due to a leakage current. Further, because the capacitor used in the internal voltage generating circuit has a considerably large capacitance as compared to a capacitor connected to a signal line, when low power consumption is required, the power consumption due to the leakage current may reach a level that is not negligible.

SUMMARY

In one embodiment, there is provided a semiconductor device that includes: a first internal voltage generating circuit that includes a capacitor having a first electrode and a second electrode and generates an internal voltage by repeating a charge operation for charging the capacitor to a first voltage and a discharge operation for applying a second voltage to the first electrode of the capacitor to generate a third voltage that is higher than the first and the second voltages on the second electrode in absolute value; and a control circuit that performs a control to apply a fourth voltage that is lower than the first voltage to the capacitor when the first internal voltage generating circuit is in a standby state.

In another embodiment, there is provided a semiconductor device that includes: an internal voltage generating circuit that includes a capacitor having a first electrode and a second electrode, generates an internal voltage in an active state, and suspends generation of the internal voltage in a standby state; and a control circuit that controls an operation of the internal voltage generating circuit, wherein when the internal voltage generating circuit is in an active state, the control circuit performs a charge operation for charging the capacitor to a predetermined voltage and a discharge operation for changing a potential that appears on the second electrode by changing a potential applied to the first electrode in an alternate manner, and when the internal voltage generating circuit is in a standby state, the control circuit suspends the charge operation.

In still another embodiment, there is provided a semiconductor device that includes: a capacitor having a first electrode and a second electrode; a first line for supplying a first potential; a second line for supplying a second potential; a first switch that is connected between the first electrode of the capacitor and the first line; a second switch that is connected between the first electrode of the capacitor and the second line; a third switch that is connected between the second electrode of the capacitor and the second line; and a control circuit that controls the first to third switches based on at least a state signal, wherein the control circuit has a first control state to switch on the first and third switches and switch off the second switch, and a second control state to switch on the second switch and switch off the first and third switches, when the state signal is in an activated state, the control circuit repeats the first control state and the second control state in an alternate manner, and when the state signal is in a deactivated state, the control circuit maintains the second control state.

According to the present invention, because a voltage applied to both ends of a capacitor is reduced when the internal voltage generating circuit is in a standby state, it is possible to reduce the power consumption due to a leakage current.

BRIEF DESCRIPTION OF THE DRAWINGS

The above features and advantages of the present invention will be more apparent from the following description of certain preferred embodiments taken in conjunction with the accompanying drawings, in which:

FIG. 10 is a diagram showing an example of a circuit that generates signals A to D.

DETAILED DESCRIPTION OF THE EMBODIMENTS

A representative example of a technical concept of the present invention is described below. That is, the technical concept of the present invention is to include a standby period to reduce a leakage current between electrodes of a capacitor by performing a control to reduce a voltage applied to the electrodes, in addition to a charge period to charge the capacitor and a discharge period to generate a boost voltage by pumping using a charge of the capacitor, in an internal voltage generating circuit that generates an internal voltage by a charge pump function using the capacitor. A step-down voltage can be applied in the same manner as the boost voltage as long as the internal voltage generating circuit employs the charge pump function.

Preferred embodiments of the present invention will be explained below in detail with reference to the accompanying drawings.

Figure 1:
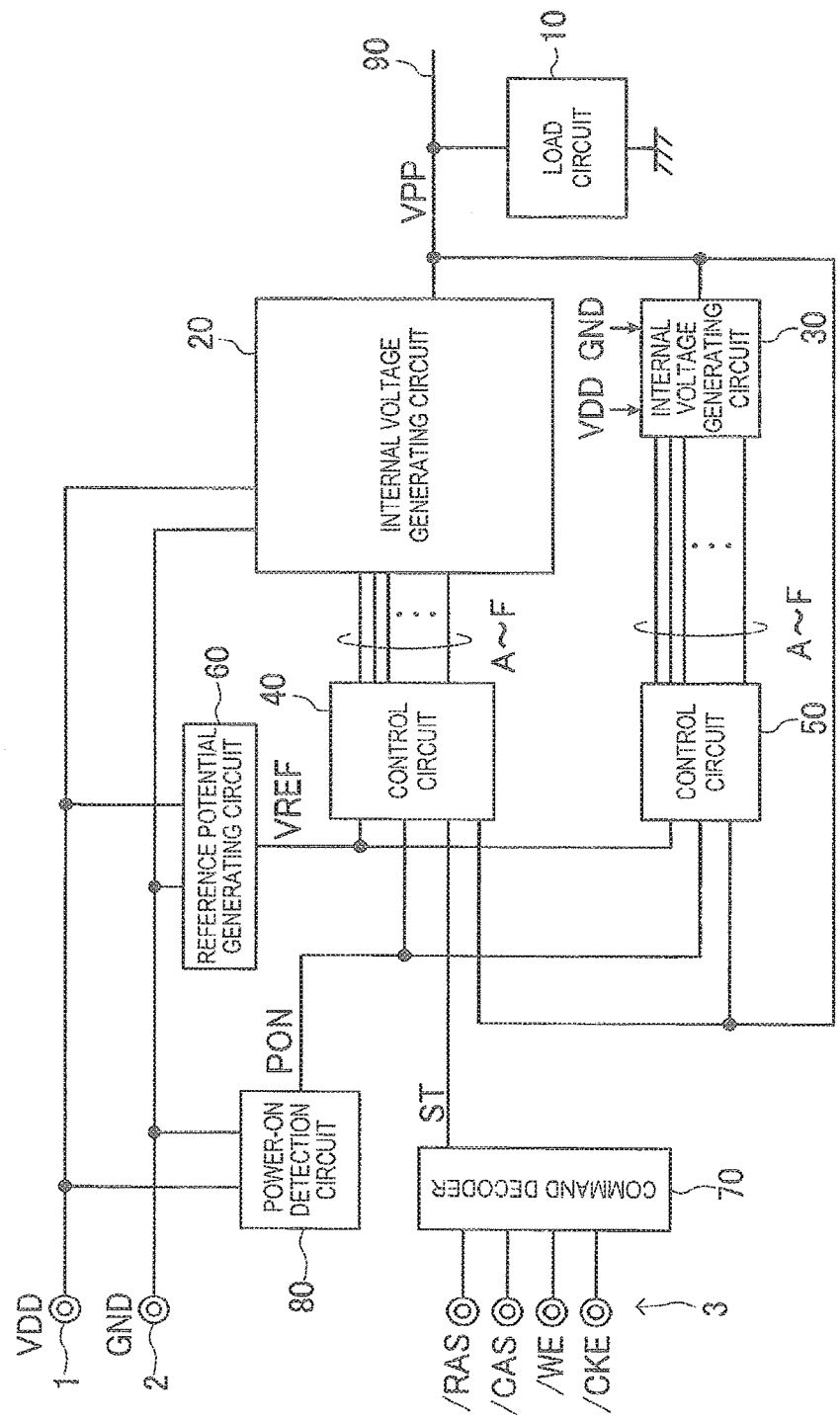
FIG. 1 is a block diagram of a semiconductor device according to an embodiment of the present invention.

FIG. 1 is a block diagram of a semiconductor device according to an embodiment of the present invention. In the present invention, the type of the semiconductor device is not particularly limited, but can be a memory system device such as a DRAM and a flash memory, or a, logic system device such as a CPU and a DSP, as long as the semiconductor device includes an internal voltage generating circuit.

As shown in FIG. 1, the semiconductor device according to the present invention includes a load circuit 10 and internal voltage generating circuits 20 and 30 that supply an internal potential VPP to the load circuit 10. The load circuit 10 is a main circuit block of the semiconductor device. For example, when the semiconductor device according to the present embodiment is a DRAM, the load circuit 10 corresponds to a memory cell array and various peripheral circuits (such as a decoder, a counter, and an amplifier). The internal potential VPP is a potential that is higher than a power source potential VDD supplied from outside via a power source terminal 1, which is used as an activation potential for a word line, for example. A potential difference between the internal potential VPP and a ground potential GND supplied from outside via a power source terminal 2 is referred to as an internal voltage VPP. In this manner, in this specification, a potential itself and a potential difference (a voltage) with the ground potential GND are explained using like reference numeral as appropriate. Although various potentials other than the internal potential VPP are supplied to the load circuit 10, explanations of these potentials are omitted.

Operations of the internal voltage generating circuits 20 and 30 are controlled by signals A to F supplied from control circuits 40 and 50, respectively. That is, the two internal voltage generating circuits 20 and 30 are subject to separate controls from each other. The internal voltage generating circuit 20 is a primary circuit for generating the internal potential VPP, which generates the internal potential VPP in an active state, while suspending the generation of the internal potential VPP in a standby state. The internal voltage generating circuit 20 is designed to be capable of maintaining the internal potential VPP to a desired level even when a load of the load circuit 10 is maximized. On the other hand, the internal voltage generating circuit 30 is a secondary circuit for generating the internal potential VPP, which constantly generates the internal potential VPP. The internal voltage generating circuit 30 is designed to be capable of maintaining the internal potential VPP to a desired level when the load circuit 10 and the internal voltage generating circuit 20 are in a standby state. That is, the voltage generating capability of the internal voltage generating circuit 30 is designed to be smaller sufficiently than that of the internal voltage generating circuit 20. Therefore, As shown in FIG. 1, the internal potential VPP is fed back to the control circuit 40 via a power source line 90, and at the same time, a reference potential VREF that is an output of a reference potential generating circuit 60, a state signal ST that is an output of a command decoder 70, and a power-on signal PON that is an output of a power-on detection circuit 80 are supplied to the control circuit 40. The control circuit 40 generates the signals A to F based on the internal potential VPP, the reference potential VREF, the state signal ST, and the power-on signal PON, to control the operation of the internal voltage generating circuit 20. Similarly, the internal potential VPP is fed back to the control circuit 50 via the power source line 90, and at the same time, the reference potential VREF and the power-on signal PON are supplied to the control circuit 40; however, the state signal ST that is the output of the command decoder 70 is not supplied to the control circuit 50.

The reference potential generating circuit 60 is a circuit that generates the reference potential VREF based on an external voltage VDD. The reference potential VREF is a potential that is used as a reference for determining whether the internal potential VPP fed back via the power source line 90 has reached a predetermined level. In the control circuits 40 and 50, it is determined whether the internal potential VPP has reached the predetermined level by comparing the reference potential VREF with a detection potential that is obtained by step down of the internal potential VPP using a resistive divider. When a result of determination shows that the internal potential VPP has not reached the predetermined level, the control circuits 40 and 50 cause the internal voltage generating circuits 20 and 30 to perform a pumping operation, and when the result of determination shows that the internal potential VPP has reached the predetermined level, suspends the pumping operation of the internal voltage generating circuits 20 and 30. With this operation, the internal potential VPP that is supplied to the load circuit 10 via the power source line 90 is stabilized to a desired level.

The command decoder 70 is a circuit that activates the state signal ST (shifts up the state signal ST to the high level) or deactivates the state signal ST (shifts down the state signal ST to the low level) based on a command signal input from a command terminal 3. The example shown in FIG. 1 shows command signals used in a DRAM. Therefore, a content of the command signal is represented by a combination of signals /RAS, /CAS, /WE, and /CKE. The state signal ST is deactivated in a case where the command signal indicates entering an operation mode in which the load of the load circuit 10 becomes considerably small. When the semiconductor device is a DRAM, this case includes a case where a self-refresh command is issued, a case where a clock enable signal /CKE is deactivated, and a case where a precharge command is issued.

The power-on detection circuit 80 is a circuit that detects a power activation of the semiconductor device. Upon detecting the power activation, the power-on detection circuit 80 activates the power-on signal PON. The power-on signal PON is supplied to the control circuits 40 and 50. Therefore, when the power-on signal PON is activated, the control circuits 40 and 50 start operations.

Figure 2:
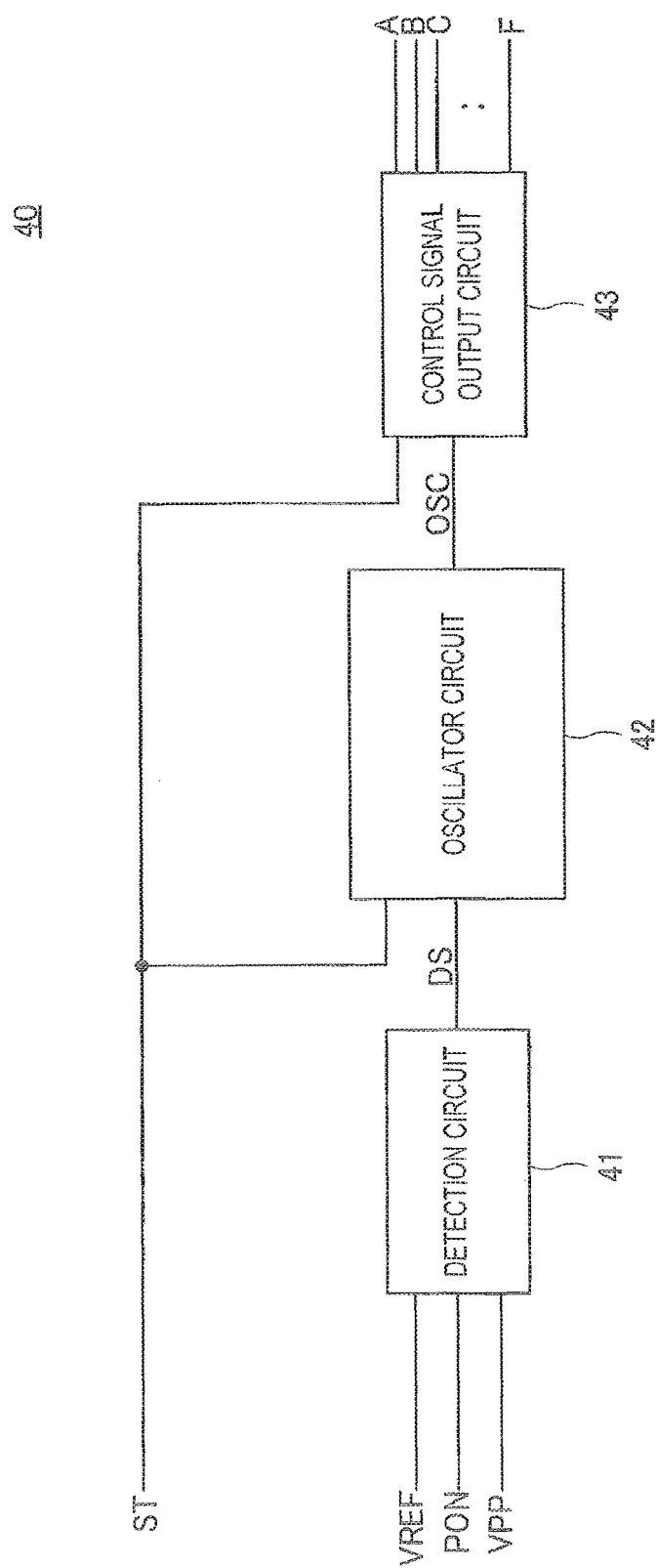
FIG. 2 is a block diagram showing a configuration of the control circuit 40.

FIG. 2 is a block diagram showing a configuration of the control circuit 40. As shown in FIG. 2, the control circuit 40 includes a detection circuit 41, an oscillator circuit 42, and a control signal output circuit 43.

The detection circuit 41 is a circuit that detects the level of the internal potential VPP based on the reference potential VREF. When the internal potential VPP is a predetermined level or higher, the detection circuit 41 deactivates a detection signal DS (shifts down the detection signal DS to the low level), and suspends an operation of the oscillator circuit 42. On the other hand, when the internal potential VPP is lower than the predetermined level, the detection circuit 41 activates the detection signal DS (shifts up the detection signal DS to the high level), and resumes the operation of the oscillator circuit 42. An operation of the detection circuit 41 is allowed by an activation of the power-on signal PON.

The oscillator circuit 42 is a circuit that receives the detection signal DS and the state signal ST and generates an oscillator signal OSC. Specifically, when the state signal ST is in an activated state (high level), if the detection signal DS is activated to the high level, the oscillator signal OSC having a predetermined cycle is output, and if the state signal ST is deactivated to the low level, the oscillator signal OSC is fixed to the low level. On the other hand, when the state signal ST is in a deactivated state (low level), the oscillator signal OSC is fixed to the low level regardless of the level of the detection signal DS.

The control signal output circuit 43 is a circuit that receives the oscillator signal OSC and the state signal ST and outputs the signals A to F. When the state signal ST is activated to the high level, the control signal output circuit 43 generates the signals A to F that are synchronized with the oscillator signal OSC. On the other hand, when the state signal ST is deactivated to the low level, the control signal output circuit 43 fixes the signals A to F respectively to predetermined logical levels.

Figure 3:
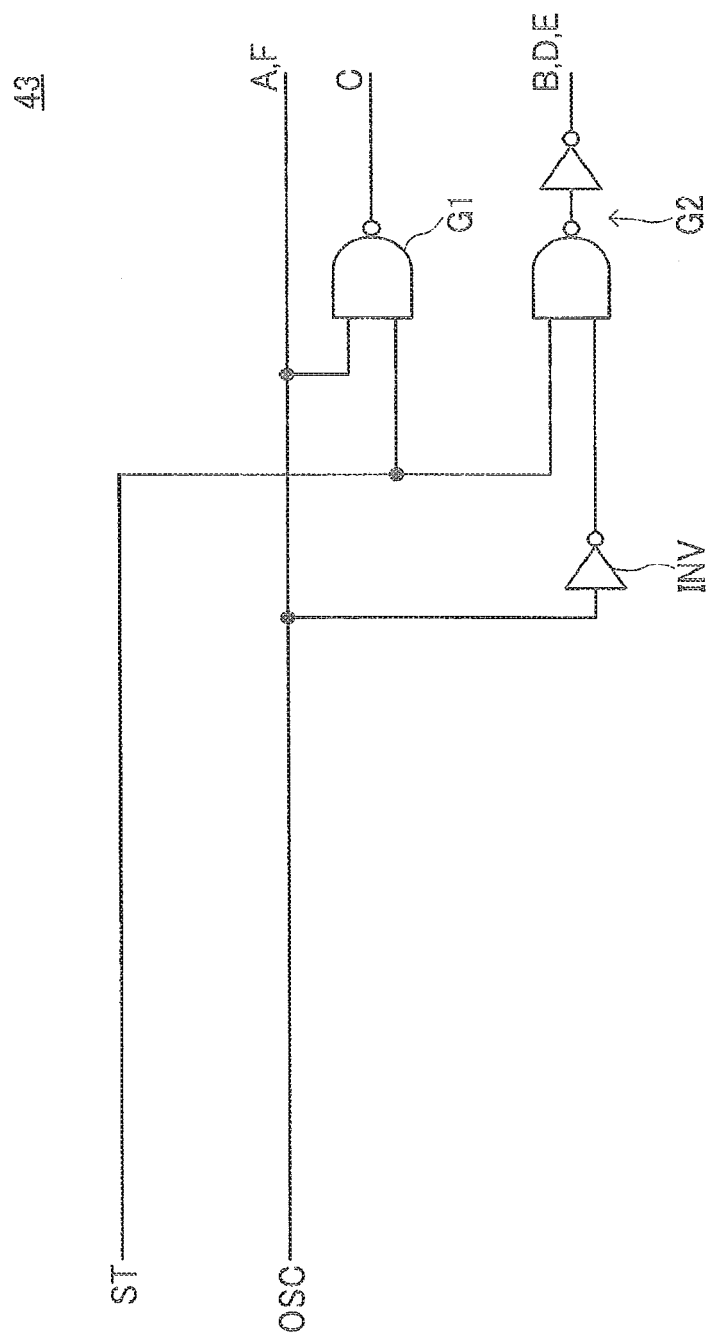
FIG. 3 is a circuit diagram of the control signal output circuit 43.

FIG. 3 is a circuit diagram of the control signal output circuit 43.

As shown in FIG. 3, the control signal output circuit 43 includes a NAND gate circuit G1 that receives the oscillator signal OSC and the state signal ST, an inverter circuit INV that inverts the oscillator signal OSC, and an AND gate circuit G2 that receives an output of the inverter circuit INV and the state signal ST. The oscillator signal OSC is output as the signals A and F, an output of the NAND gate circuit G1 is used as the signal C, and an output of the AND gate circuit G2 is used as the signals B, D, and E.

With this configuration, when the state signal ST is the high level (activated state), the signals A, C, and F have the same phase as the oscillator signal OSC, and the signals B, D, and E have an opposite phase to the oscillator signal OSC. On the other hand, when the state signal ST is the low level (deactivated state), the signal C is fixed to the high level, and the signals B, D, and E are fixed to the low level. Because the oscillator signal OSC is fixed to the low level when the state signal ST is deactivated, the levels of the signals A and F also become the low level. The signals A to F that are generated in this manner are supplied to the internal voltage generating circuit 20.

Figure 4:
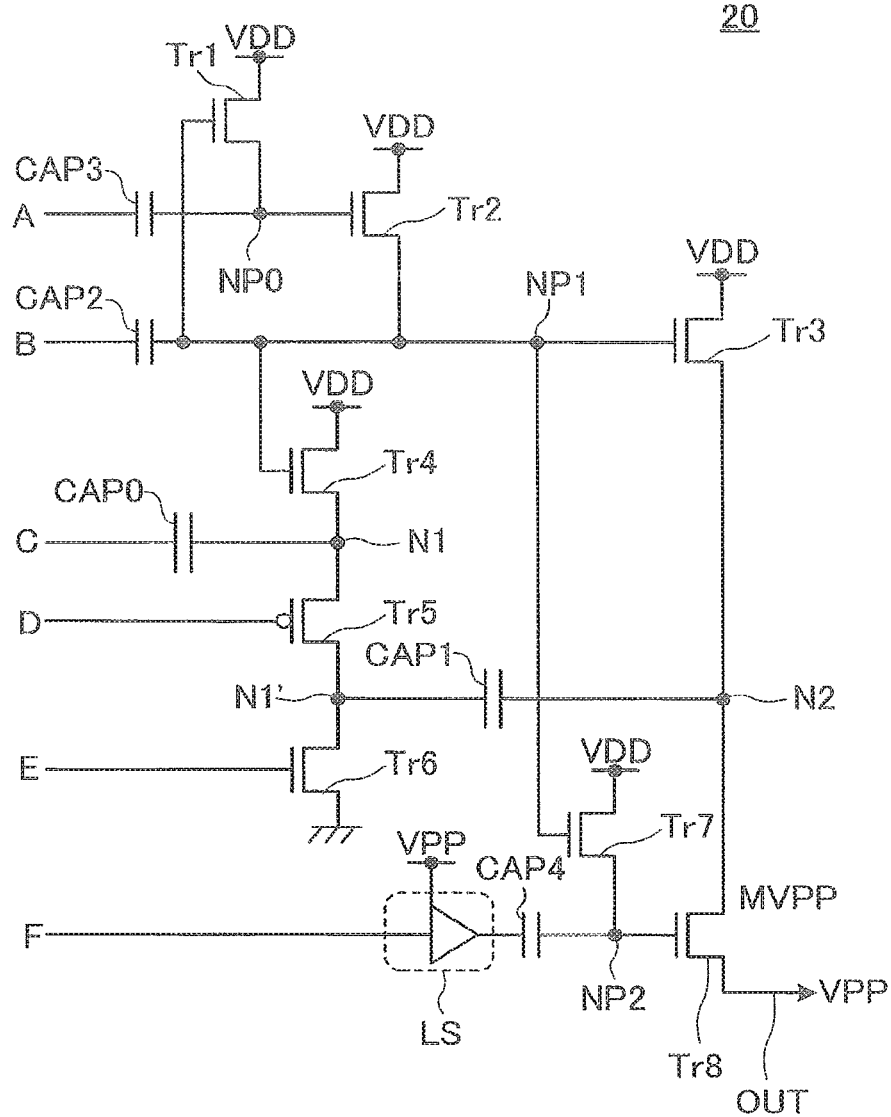
FIG. 4 is a circuit diagram of the internal voltage generating circuit 20.

FIG. 4 is a circuit diagram of the internal voltage generating circuit 20.

As shown in FIG. 4, the internal voltage generating circuit 20 includes transistors Tr1 to Tr8 and capacitors CAP0 to CAP4. Among the transistors Tr1 to Tr8, the transistor Tr5 is a P-channel MOS transistor, while the other transistors are all N-channel MOS transistors. As for the capacitors CAP0 to CAP4, it is possible to use MOS gate capacitances.

Specifically, the transistor Tr1 is connected between a line to which the power source potential VDD is supplied and an internal node NP0, and its gate electrode is connected to an internal node NP1. Similarly, the transistor Tr2 is connected between the line to which the power source potential VDD is supplied and the internal node NP1, and its gate electrode is connected to the internal node NP0. The internal node NP0 is a node to which the signal A is supplied via the capacitor CAP3, and the internal node NP1 is a node to which the signal B is supplied via the capacitor CAP2.

The transistor Tr3 is connected between the line to which the power source potential VDD is supplied and an internal node N2, and its gate electrode is connected to the internal node NP1. The internal node N2 is a node at which a boost potential MVPP is generated. The output transistor Tr8 is connected between the internal node N2 and an output terminal OUT. With this configuration, the boost potential MVPP is supplied to the power source line 90 shown in FIG. 1 via the output terminal OUT for a period when the output transistor Tr8 is switched on.

A gate electrode of the output transistor Tr8 is connected to an internal node NP2. The internal node NP2 is connected to the line to which the power source potential VDD is supplied, via the transistor Tr7 of which a gate electrode is connected to the internal node NP1. The signal F is supplied to the internal node NP2 via a level shifter LS and the capacitor CAP4. The level shifter LS is a circuit that converts an amplitude of the signal F from VDD to VPP.

Furthermore, the transistors Tr4 to Tr6 are connected in series between the line to which the power source potential VDD is supplied and a line to which the ground potential GND is supplied. A gate electrode of the transistor Tr4 is connected to the internal node NP1, the signal D is supplied to a gate electrode of the transistor Tr5, and the signal E is supplied to a gate electrode of the transistor Tr6. The signal C is supplied to an internal node N1, which is a connection point of the transistor Tr4 and the transistor Tr5, via the capacitor CAP0. An internal node N1', which is a connection point of the transistor Tr5 and the transistor Tr6, is connected to the internal node N2 via the capacitor CAP1.

The capacitors CAP0 and CAP1 are capacitors for pumping the internal node N2, so that they are designed to have sufficiently larger capacitances than the other capacitors CAP2 to CAP4 for driving the gate electrodes. Therefore, although a leakage current between the electrodes does not practically matter in the capacitors CAP2 to CAP4, it causes a significant problem in the capacitors CAP0 and CAP1.

Figure 5A:
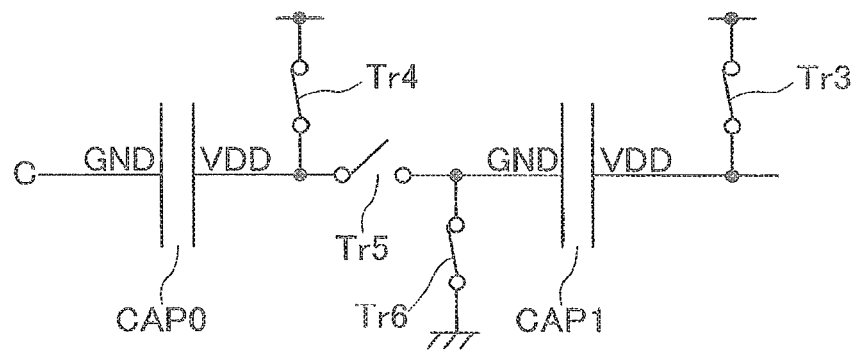
FIG. 5A is an equivalent circuit diagram showing a charge operation.

With this configuration, when levels of the signals A, C, and F are the low level and levels of the signals B, D, and E are the high level, both the capacitors CAP0 and CAP1 are charged to a VDD level as shown in FIG. 5A, which is an equivalent circuit diagram. This is a period when a charge operation is performed. On the other hand, when the levels of the signals A, C, and F are the high level and the levels of the signals B, D, and E are the low level, the capacitors CAP0 and CAP1 enters a state shown in FIG. 5B, which is an equivalent circuit diagram. This is a period for a discharge operation in which the capacitors CAP0 and CAP1 that are charged to the VDD level by the charge operation are subject to pumping. By this discharge operation, the internal nodes N1 and N1' are stepped up to about two times the VDD level, and the internal node N2 is stepped up to three times the VDD level. Therefore, by alternately repeating the charge operation and the discharge operation, it is possible to generate the internal potential VPP having ideally three times the VDD level.

Figure 6:
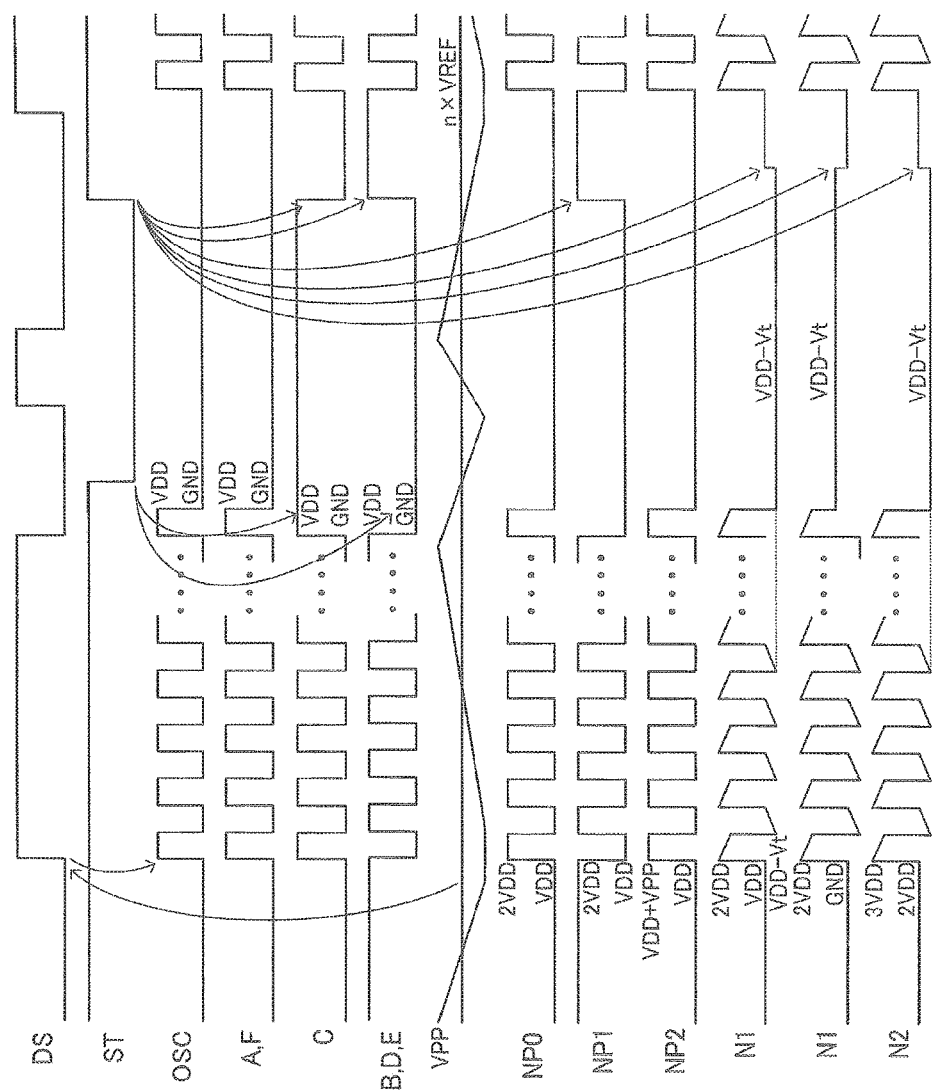
FIG. 6 is a waveform diagram for explaining an operation of the semiconductor device according to the present embodiment.

FIG. 6 is a waveform diagram for explaining an operation of the semiconductor device according to the present embodiment.

As shown in FIG. 6, the operation of the internal voltage generating circuit 20 is determined by logical levels of the detection signal DS and the state signal ST. Specifically, a state of the operation is divided into a first state where both the levels of the state signal ST and the detection signal DS are the high level (activated level), a second state where the state signal ST is the high level (activated level) and the detection signal DS is the low level (deactivated level), and a third state where the state signal ST is the low level (deactivated level).

The first and second states correspond to an active state of the internal voltage generating circuit 20, in which the internal voltage generating circuit 20 is controlled such that the internal potential VPP that appears on the power source line 90 converges to a predetermined potential. Therefore, when the detection circuit 41 detects that the internal potential VPP that appears on the power source line 90 is lower than the predetermined potential, the detection signal DS is changed to the high level, by which an operation of generating the internal potential VPP is performed.

Figure 5B:
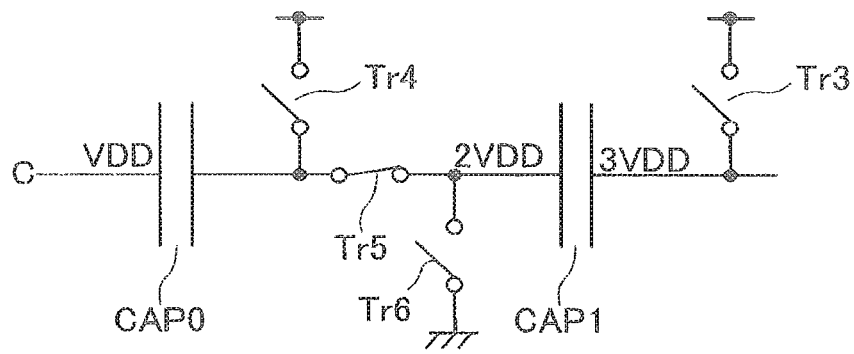
FIG. 5B is an equivalent circuit diagram showing a discharge operation.

That is, the signals A to F are changed in synchronization with the oscillator signal OSC, by which the internal voltage generating circuit 20 repeats the charge operation shown in FIG. 5A and the discharge operation shown in FIG. 5B in an alternate manner. As shown in FIG. 6, in the charge operation, because the signal C (a signal applied to a first electrode of the capacitor CAP0) becomes a GND level and the internal node N1 (a second electrode of the capacitor CAP0) becomes the VDD level, a charge voltage of the capacitor CAP0 becomes VDD (a first voltage). Similarly, because the internal node N1' (a first electrode of the capacitor CAP1) becomes the GND level and the internal node N2 (a second electrode of the capacitor CAP1) becomes the VDD level, a charge voltage of the capacitor CAP1 also becomes VDD (the first voltage). On the other hand, in the discharge operation, because the signal C is changed to the VDD level (the first voltage), the internal node N1 is ideally stepped up to two times the VDD level (a second voltage). Similarly, because the internal node N1' is changed to the VDD level (the second voltage), the internal node N2 is ideally stepped up to three times the VDD level (a third voltage).

Meanwhile, when the detection circuit 41 detects that the internal potential VPP that appears on the power source line 90 is higher than the predetermined potential, the detection signal DS becomes the low level, by which the operation of generating the internal potential VPP is suspended. In this case, because the oscillator signal OSC is fixed to the low level, the internal voltage generating circuit 20 is maintained in the state of the charge operation shown in FIG. 5A.

Figure 7A:
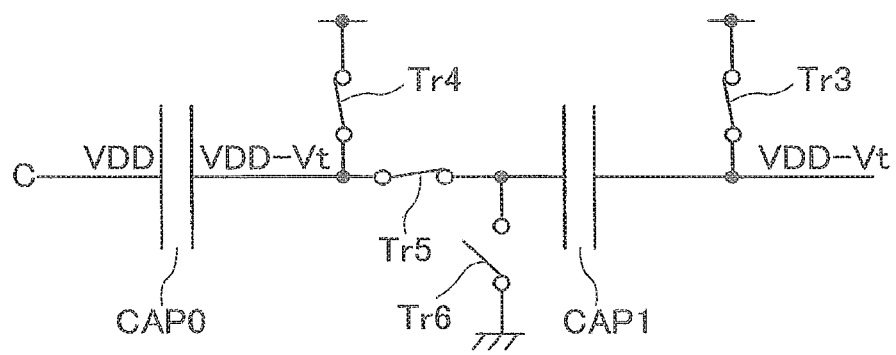
FIG. 7A is an equivalent circuit diagram showing an example of a standby state.

On the other hand, the third state corresponds to a standby state of the internal voltage generating circuit 20, in which the operation of the internal voltage generating circuit 20 is suspended. In this case, the internal voltage generating circuit 20 is not maintained in the state of the charge operation, unlike the second state described above, the signal C becomes the high level, and the levels of the signals A, B, D, E, and F become the low level. With this operation, as shown in FIG. 7A, which is an equivalent circuit diagram, only a threshold voltage Vt (a fourth voltage) of the transistor Tr4 is applied to both ends of the capacitor CAP0, and a voltage applied to the both ends of the capacitor CAP1 becomes zero (a fourth voltage). The transistor Tr4 is a transistor for charging the capacitor CAP0 to the VDD level (the first voltage).

With this arrangement, the voltages applied to the capacitors CAP0 and CAP1 are reduced as compared to a case where the internal voltage generating circuit 20 is maintained to the state of the charge operation shown in FIG. 5A. That is, if the internal voltage generating circuit 20 is maintained to the state of the charge operation shown in FIG. 5A, the voltages applied to the both ends of the capacitors CAP0 and CAP1 are VDD, as shown in FIG. 5A. However, in the present embodiment, because the voltages applied to the both ends of the capacitors CAP0 and CAP1 are considerably small in a standby state, the leakage current is considerably reduced. The high level of the signal C in the standby state can be set at not VDD level but VDD-Vt level. This can be realized by supplying the high level of the signal C in the active state via P-cannel MOS transistor and supplying the high level of the signal C in the standby state via N-cannel MOS transistor. In this case because the voltage of the capacitors CAP0 and CAP1 can be substantially zero, the leakage current is further reduced. In addition, because the signal F is the low level in a standby state, the output transistor Tr8 is switched off, and the power source line 90 and the internal node N2 of the internal voltage generating circuit 20 are cut off.

Because levels of the signals A and F in a standby state is not substantially affected by the voltages applied to the capacitors CAP0 and CAP1, it is not essential to fix the signals A and F to the low level, but one or both of the signals A and F can be set to the high level. This means that the levels of the signals A and F can be set to the same level as that in the discharge operation in an active state. However, if the signal F is set to the high level in a standby state, the output transistor Tr8 is switched on, and the power source line 90 and the internal node N2 of the internal voltage generating circuit 20 are short-circuited, resulting in a flow of the leakage current through the capacitor CAP1. Furthermore, if both the signals A and F are set to the high level in a standby state, the operation becomes the same as the discharge operation, and thus if the state signal ST makes a transition with a high frequency, the same operation as the boost operation is performed with a high frequency, regardless of the level of the internal potential VPP that appears on the power source line 90. This results in a possibility that the level of the power source line 90 continues to rise. Considering these aspects, it is preferable that the levels of the signals A and F in a standby state be fixed to the low level, as described above.

Figure 7B:
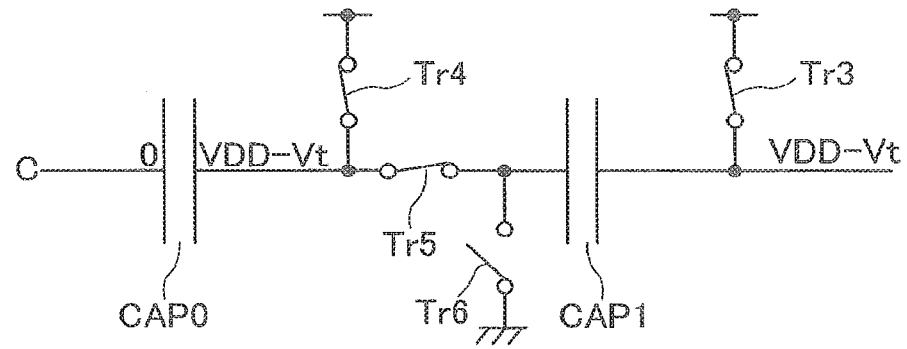
FIG. 7B is an equivalent circuit diagram showing another example of a standby state.

Although the level of the signal C is set to the high level in the above example, it can also be set to the low level. In this case, as shown in FIG. 7B, which is an equivalent circuit diagram, the voltage applied to the both ends of the capacitor CAP0 becomes VDD-Vt. As a result, although the leakage current is larger than that of the example shown in FIG. 7A, it is possible to sufficiently reduce the leakage current as compared to the case of maintaining the internal voltage generating circuit 20 to the charge operation shown in FIG. 5A. Besides, because it suffices that the signals A to F are all set to the low level in this example, there is an advantage that the control is easy.

As described above, in the present embodiment, because the voltages applied to the both ends of the capacitors CAP0 and CAP1 are lower than VDD when the internal voltage generating circuit 20 is in a standby state, it is possible to reduce the leakage current in a standby state.

Furthermore, although the internal voltage generating circuit 20 that generates a boost potential is exemplified in the explanations of the present embodiment, the application target of the present invention is not limited thereto, and it can be also applied to an internal voltage generating circuit that generates a negative potential that is lower than the ground potential GND, for example.

Figure 8:
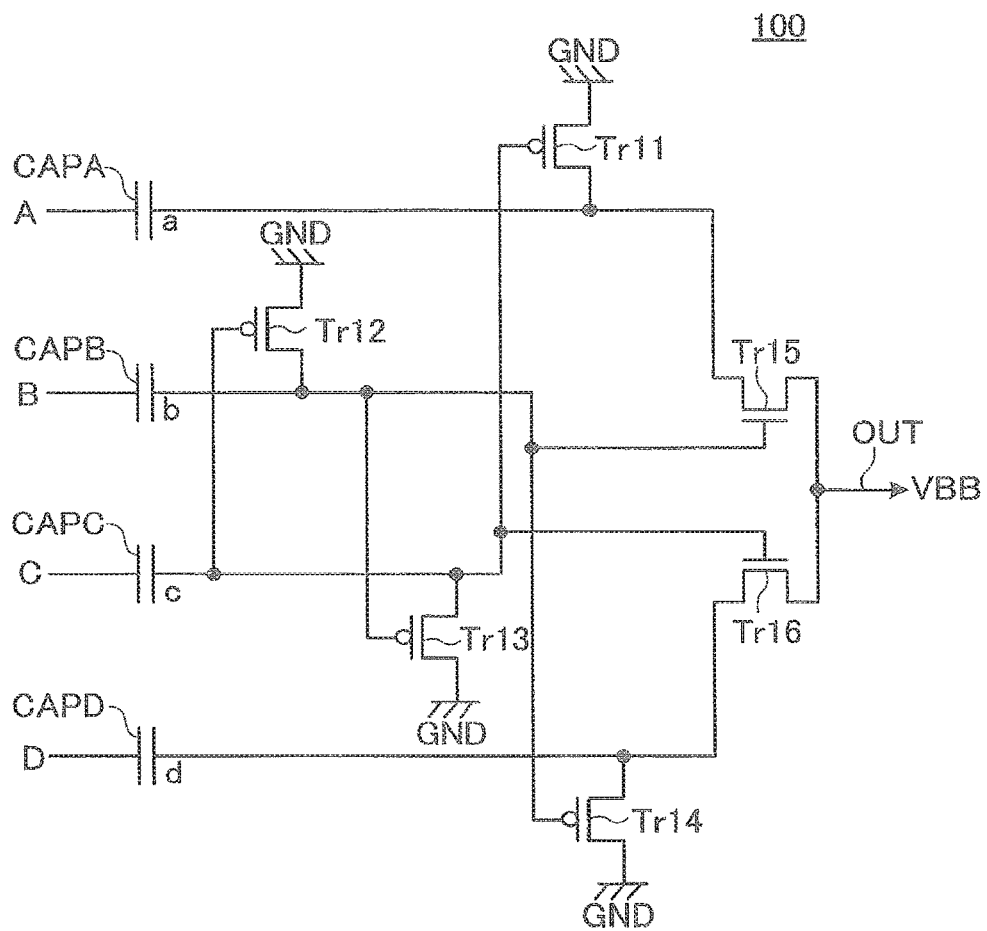
FIG. 8 is a circuit diagram of an internal voltage generating circuit 100 that generates a negative potential.

FIG. 8 is a circuit diagram of an internal voltage generating circuit 100 that generates a negative potential.

The internal voltage generating circuit 100 shown in FIG. 8 is a circuit that generates a negative potential VBB, including capacitors CAPA to CAPD and transistors Tr11 to Tr16. Specifically, signals A to D are supplied to one ends of the capacitors CAPA to CAPD, respectively, and internal nodes a to d, which are other ends of the capacitors CAPA to CAPD, are connected to the ground potential GND via the transistors Tr11 to Tr14, respectively. The transistors Tr11 to Tr14 are all P-channel MOS transistors. Gate electrodes of the transistors Tr11 and Tr12 are connected to the internal node c, and gate electrodes of the transistors Tr13 and Tr14 are connected to the internal node b.

The transistor Tr15 is connected between the internal node a and the output terminal OUT, and a gate electrode of the transistor Tr15 is connected to the internal node b. Similarly, the transistor Tr16 is connected between the internal node d and the output terminal OUT, and a gate electrode of the transistor Tr16 is connected to the internal node c. The transistors Tr15 and Tr16 are all N-channel MOS transistors.

Figure 9:
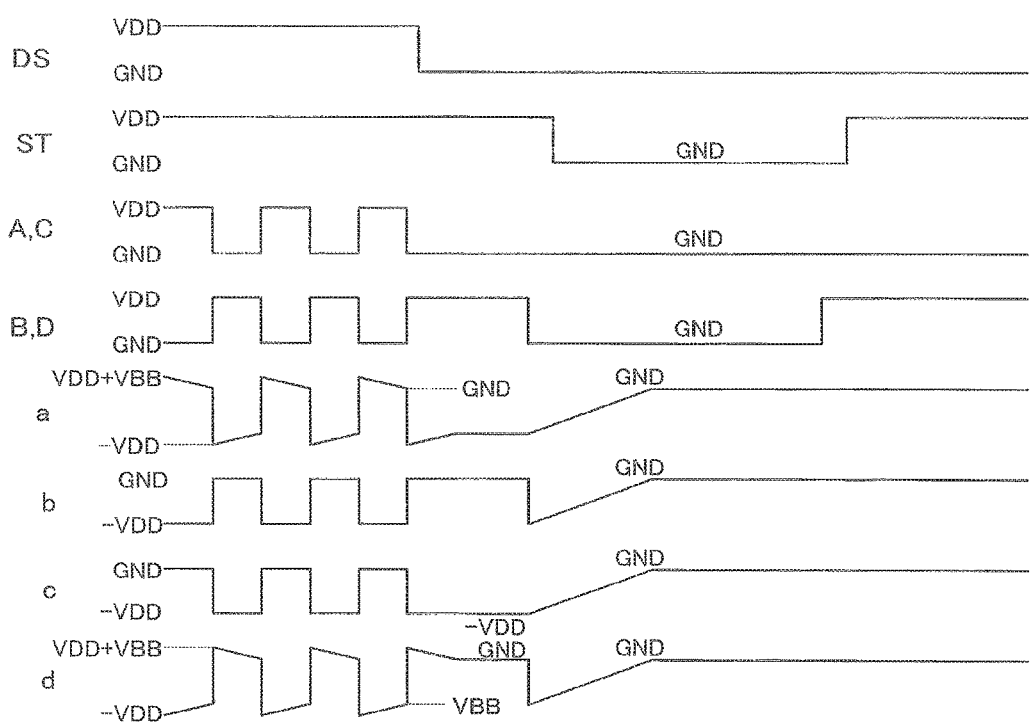
FIG. 9 is an operational waveform diagram of the internal voltage generating circuit 100.

FIG. 9 is an operational waveform diagram of the internal voltage generating circuit 100.

As shown in FIG. 9, an operation of the internal voltage generating circuit 100 is also determined by the logical levels of the detection signal DS and the state signal ST. Specifically, a state of the operation is divided into a first state where both the levels of the state signal ST and the detection signal DS are the high level (activated level), a second state where the state signal ST is the high level (activated level) and the detection signal DS is the low level (deactivated level), and a third state where the state signal ST is the low level (deactivated level). That is, this is the same as the case of the internal voltage generating circuit 20 described above.

The first and second states correspond to an active state of the internal voltage generating circuit 100, in which the internal voltage generating circuit 100 is controlled such that the negative potential VBB that appears on the power source line 90 converges to a predetermined potential. Therefore, when it is detected that the negative potential VBB is higher than the predetermined potential, the detection signal DS is changed to the high level, by which an operation of generating the negative potential VBB is performed. In this case, the signals A to D are changed with a predetermined cycle. On the other hand, when it is determined that the negative potential VBB is lower than the predetermined potential, the detection signal DS is changed to the low level, by which the operation of generating the negative potential VBB is suspended.

Besides, when the state signal ST is changed to the low level, the state of the operation is changed to a standby state, which is the third state, and the operation of the internal voltage generating circuit 100 is suspended. In this case, because the signals A to D are all changed to the low level, the voltages applied to the both ends of the capacitors CAPA to CAPD are reduced as compared to an active state. With this operation, it is possible to reduce the leakage current in a standby state. In order to perform such a control, as shown in FIG. 10, it suffices to use an AND gate circuit G3 that receives the state signal ST and the oscillator signal OSC and to set an output of the AND gate circuit G3 as the signals B and D.

It is apparent that the present invention is not limited to the above embodiments, but may be modified and changed without departing from the scope and spirit of the invention.

For example, although the internal voltage generating circuit 20 shown in FIG. 4 is configured to generate the internal potential MVPP that is ideally stepped up to three times the VDD level (precisely, 2VDD<MVPP<3VDD) by using the two capacitors CAP0 and CAP1 that are connected in series, it is also acceptable to use three or more capacitors according to a necessary voltage. In addition, it is also acceptable to use only one capacitor.

Furthermore, although the semiconductor device shown in FIG. 1 includes the internal voltage generating circuit 30 that is constantly in an active state, as well as the internal voltage generating circuit 20 that can enter a standby state, the internal voltage generating circuit 30 is not necessarily to be constantly in an active state. For example, it suffices that the internal voltage generating circuit 30 is in an active state only when the internal voltage generating circuit 20 is in a standby state. In addition, as long as the internal potential VPP can be promptly raised to a predetermined potential upon the internal voltage generating circuit 20 being changed from a standby state to an active state, the internal voltage generating circuit 30 can be omitted.

What is claimed is:

1. A method for controlling a charge pump comprising:
   alternatively charging a first capacitor to a first voltage difference and discharging the first capacitor by applying a second voltage to a first electrode of the first capacitor to generate a third voltage greater in absolute value than the first voltage difference and greater in absolute value than the second voltage on a second electrode of the first capacitor in an active state of the charge pump; and
   applying a fourth voltage difference less than the first voltage difference to the first capacitor in a standby state of the charge pump, wherein applying the fourth voltage difference comprises applying a fourth voltage to a first end of the first capacitor and a fifth voltage to a second end of the first capacitor, and the fourth voltage and fifth voltage are greater than zero.

2. The method as claimed in claim 1, wherein the first voltage difference is VDD and the second voltage is VDD.

3. The method as claimed in claim 2, wherein the fourth voltage difference is VDD-Vt.

4. The method as claimed in claim 2, wherein the fourth voltage difference is Vt.

5. The method as claimed in claim 2, wherein the third voltage is 2VDD.

6. The method as claimed in claim 1, wherein the first capacitor is a MOS gate capacitor.

7. The method as claimed in claim 1, further comprising alternatively charging a second capacitor to the first voltage difference and discharging the second capacitor by applying the third voltage to a first electrode of the second capacitor to generate a fifth voltage greater in absolute value than the third voltage on a second electrode of the second capacitor in the active state of the charge pump.

8. The method as claimed in claim 7, further comprising applying a sixth voltage difference less than the first voltage difference to the second capacitor in the standby state of the charge pump.

9. The method as claimed in claim 8, wherein the sixth voltage difference is zero.

10. The method as claimed in claim 7, wherein the first voltage difference is VDD and the second voltage is VDD.

11. The method as claimed in claim 10, wherein the fourth voltage difference is VDD-Vt.

12. The method as claimed in claim 10, wherein the fourth voltage difference is Vt.

13. The method as claimed in claim 10, wherein the third voltage is 2VDD and the fifth voltage is 3VDD.

14. The method as claimed in claim 7, wherein the first and second capacitors are MOS gate capacitors.

* * * * *